US012083548B2

(12) United States Patent
Ray et al.

(10) Patent No.: US 12,083,548 B2
(45) Date of Patent: Sep. 10, 2024

(54) SYSTEMS AND METHODS FOR HIGH FIDELITY AEROSOL JET PRINTING VIA ACOUSTIC FORCES

(71) Applicants: University of Maryland, College Park, College Park, MD (US); The Government of the United States as represented by the Director, National Security Agency, Fort George G. Meade, MD (US)

(72) Inventors: Tyler Ray, Honolulu, HI (US); Daniel R. Hines, Damascus, MD (US)

(73) Assignees: University of Maryland, College Park, College Park, MD (US); The Government of the United States As Represented by the Director, National Security Agency, Ft. George G. Meade, MD (US)

( * ) Notice: Subject to any disclaimer, the term of this patent is extended or adjusted under 35 U.S.C. 154(b) by 117 days.

(21) Appl. No.: 17/195,300

(22) Filed: Mar. 8, 2021

(65) Prior Publication Data

US 2021/0276327 A1 Sep. 9, 2021

Related U.S. Application Data

(60) Provisional application No. 62/986,301, filed on Mar. 6, 2020.

(51) Int. Cl.
*B05B 17/00* (2006.01)
*B05B 17/06* (2006.01)

(52) U.S. Cl.
CPC .......... *B05B 17/0646* (2013.01); *B05B 17/06* (2013.01); *B05B 17/0638* (2013.01); *B05B 17/0676* (2013.01)

(58) Field of Classification Search
CPC ............ A61M 15/0085; A61M 11/005; B05B 17/06563; B05B 17/063; B05B 17/06;
(Continued)

(56) References Cited

U.S. PATENT DOCUMENTS

| | | | |
|---|---|---|---|
| 2018/0071981 A1 | 3/2018 | Collino et al. | |
| 2020/0316859 A1 | 10/2020 | Collino et al. | |

FOREIGN PATENT DOCUMENTS

| | | | | |
|---|---|---|---|---|
| JP | S62129173 | * 6/1987 | ............ | B05B 17/06 |
| WO | 2016161109 A1 | 10/2016 | | |

OTHER PUBLICATIONS

Collino, Acoustic Field Controller Patterning and Assembly of Anisotropic Particles, Extreme Mechanics Letters 5 (2015) 37-46 (Year: 2015).*

(Continued)

*Primary Examiner* — Christopher R Dandridge
(74) *Attorney, Agent, or Firm* — George Likourezos; Carter, DeLuca & Farrell LLP

(57) ABSTRACT

An aspect of the present disclosure provides a system for aerosol jet printing an aerosolized particle source configured to selectively provide aerosolized particles, a nozzle configured to deposit aerosolized particles on a substrate, an actuator configured to generate acoustic energy for migrating the particles, and a generator configured to selectively energize the actuator. The nozzle includes a proximal inlet configured for passage of aerosolized particles, a column configured to focus the aerosolized particles when vibrated by an actuator, and a distal opening configured for deposition of the particles on a substrate.

21 Claims, 7 Drawing Sheets

(58) Field of Classification Search
CPC ............ B05B 17/0646; B05B 17/0638; B05B 17/0676; B05B 17/0615; G03G 9/00; G03G 9/08; G03G 9/0825; G03G 9/0819; G03G 9/08797
See application file for complete search history.

(56) References Cited

OTHER PUBLICATIONS

Rachel R. Collino, et al., "Deposition of ordered two-phase materials using microfluidic print nozzles with acoustic focusing", Extreme Mechanics Letters, pp. 1-19, (Year: 2016).*
Rachel R. Collino, et al., "Deposition of ordered two-phase materials using microfluidic print nozzles with acoustic focusing", Extreme Mechanics Letters, pp. 1-19, Mar. 31, 2016.
Drew S. Melchert, et al., "Flexible Conductive Composites with Programmed Electrical Anisotropy Using Acoustophoresis", Advanced Material Technologies, pp. 1-8, 2019.
Keith Johnson, et al., "Recent progress in acoustic field-assisted 3D-printing of functional composite materials", MRS Advances, pp. 1-8, Jun. 22, 2021.
Rachel R. Collino, et al., "Acoustic field controlled patterning and assembly of anisotropic particles", Extreme Mechanics Letters, pp. 1-10, 2015.
Rachel R. Collino, et al., "Scaling relationships for acoustic control of two-phase microstructures during direct-write printing", Materials Research Letters, pp. 1-9, Feb. 3, 2018.

* cited by examiner

SYSTEMS AND METHODS FOR HIGH FIDELITY AEROSOL JET PRINTING VIA ACOUSTIC FORCES

CROSS-REFERENCE TO RELATED APPLICATION/CLAIM OF PRIORITY

This application claims the benefit of, and priority to, U.S. Provisional Patent Application No. 62/986,301, filed on Mar. 6, 2020, of which the entire contents are hereby incorporated herein by reference.

GOVERNMENT LICENSE RIGHTS

This invention was made jointly by the National Security Agency and with government support under H98230-19-C0220 awarded by the National Security Agency. The government has certain rights in the invention.

TECHNICAL FIELD

The present disclosure relates generally to the field of additive manufacturing. More specifically, an aspect of the present disclosure provides a system and a method relating to spray deposition techniques of additive manufacturing.

BACKGROUND

In traditional annular jet printing, an aerosol jet is used to form an annular propagation jet with an outer sheath flow and internal aerosol-laden carrier flow. This method causes a print line with considerable over spray, unfocused lines, and wastes ink. Accordingly, there is interest in systems and methods to improve the jet printing process and higher resolution fabrication.

SUMMARY

Embodiments of the present disclosure are described in detail with reference to the drawings wherein like reference numerals identify similar or identical elements.

An aspect of the present disclosure provides a system for aerosol jet printing includes an aerosolized particle source configured to selectively provide aerosolized particles, a nozzle configured to deposit aerosolized particles on a substrate, an actuator configured to generate acoustic energy for migrating the particles, and a generator configured to selectively energize the actuator. The nozzle includes a proximal inlet configured for passage of aerosolized particles, a column configured to focus the aerosolized particles when vibrated by an actuator, and a distal opening configured for deposition of the particles on a substrate.

In accordance with aspects of the disclosure, the distal opening may include a square, a rounded square, a rectangular, a rounded rectangle an oval, or a circular shaped cross-section.

In an aspect of the present disclosure, the column may be in registration with the proximal inlet and the distal opening.

In another aspect of the present disclosure, the column may include an outer surface configured for mounting of the actuator.

In yet another aspect of the present disclosure, the column may taper to the distal opening.

In a further aspect of the present disclosure, the column may be made from a material that transfers acoustic energy.

In yet a further aspect of the present disclosure, an inner surface of the column may define a channel. The channel may be configured for the passage of the aerosolized particles.

In an aspect of the present disclosure, the column may be configured to transfer the acoustic energy of the actuator to the channel.

In another aspect of the present disclosure, the channel may be a half-wave, a quarter-wave, and/or an eighth-wave resonator.

In yet another aspect of the present disclosure, the channel may include a square, a rounded square, a rectangular, a rounded rectangle an oval, or a circular shaped cross-section.

In a further aspect of the present disclosure, the actuator may vibrate the channel at or near a resonant frequency of the channel.

An aspect of the present disclosure provides a nozzle for aerosol jet printing. The nozzle includes a proximal inlet configured for passage of aerosolized particles, a column configured to focus the aerosolized particles when vibrated by an actuator, and a distal opening configured for deposition of the particles on a substrate.

In yet a further aspect of the present disclosure, the distal opening may include a square, a rounded square, a rectangular, a rounded rectangle an oval, or a circular shaped cross-section.

In an aspect of the present disclosure, the column may be in registration with the proximal inlet and the distal opening.

In another aspect of the present disclosure, the column may include an outer surface configured for mounting of the actuator.

In yet another aspect of the present disclosure, the column may taper to the distal opening.

In a further aspect of the present disclosure, the column may be made from a material that transfers acoustic energy.

In yet a further aspect of the present disclosure, an inner surface of the column may define a channel. The channel may be configured for the passage of the aerosolized particles.

In an aspect of the present disclosure, the column may be configured to transfer the acoustic energy of the actuator to the channel.

In an aspect of the present disclosure, a method for aerosol jet printing includes aerosolizing particles with a fluid media, receiving the aerosolized particles in a proximal inlet of a nozzle, and vibrating a column of the nozzle by an actuator at a resonant frequency of a channel of the column. The aerosolized particles are vibrated in the channel. The proximal inlet is configured for passage of aerosolized particles.

In a further aspect of the present disclosure, the method may further include focusing the aerosolized particles in the column based on the frequency of the acoustic energy.

In yet a further aspect of the present disclosure, the method may further include depositing the particles on a substrate via a distal opening of the column.

In another aspect of the present disclosure, the vibrating of the column may be performed by an actuator.

In another aspect of the present disclosure, the actuator may include a piezo transducer.

In another aspect of the present disclosure, the actuator may vibrate the channel at or near a resonant frequency of the channel.

Further details and aspects of exemplary embodiments of the present disclosure are described in more detail below with reference to the appended FIGURES.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

Figure 1:
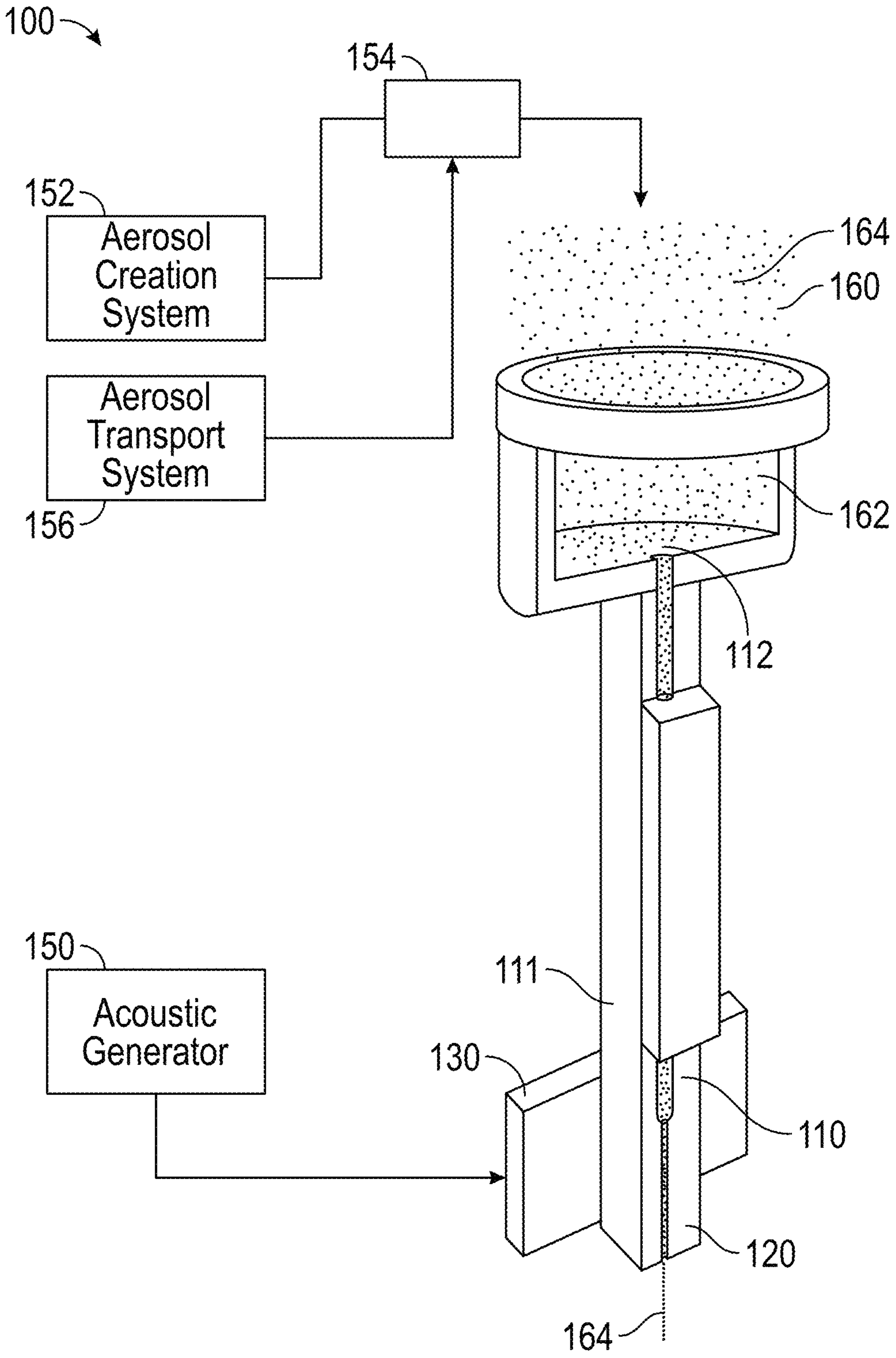
FIG. 1 illustrates a cutaway perspective view of a system for high fidelity aerosol jet printing via acoustic forces, in accordance with the present disclosure.

Further details and aspects of various embodiments of the present disclosure are described in more detail below with reference to the appended FIGURES.

DETAILED DESCRIPTION

The present disclosure relates generally to the field of additive manufacturing. More specifically, an aspect of the present disclosure provides a system and a method relating to spray deposition techniques of additive manufacturing.

Although the present disclosure will be described in terms of specific embodiments, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Figure 2:
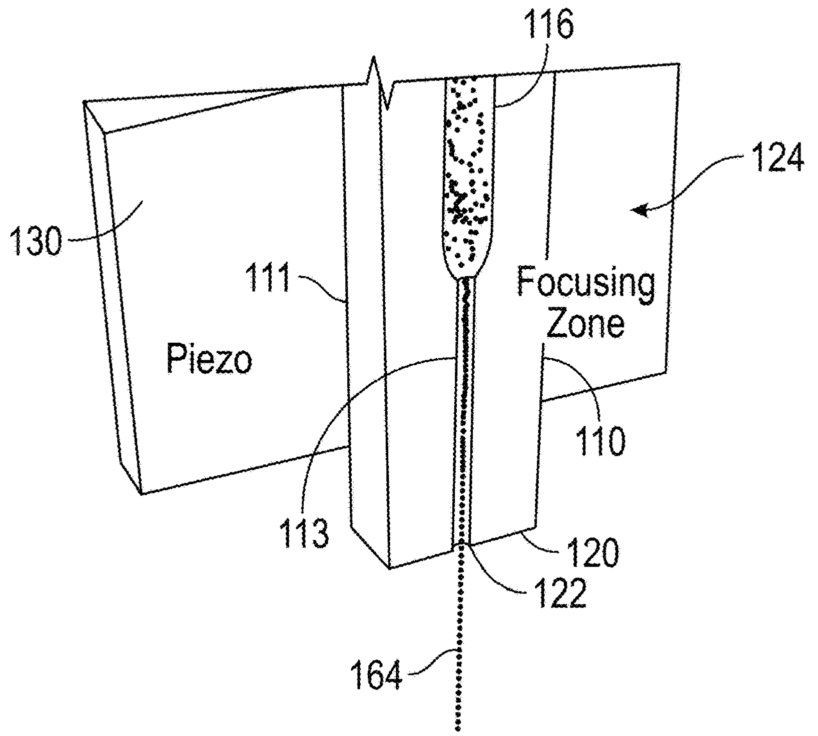
FIGS. 2 and 3 illustrate cutaway perspective views of a nozzle of the system of FIG. 1, in accordance with the present disclosure.
Figure 3:
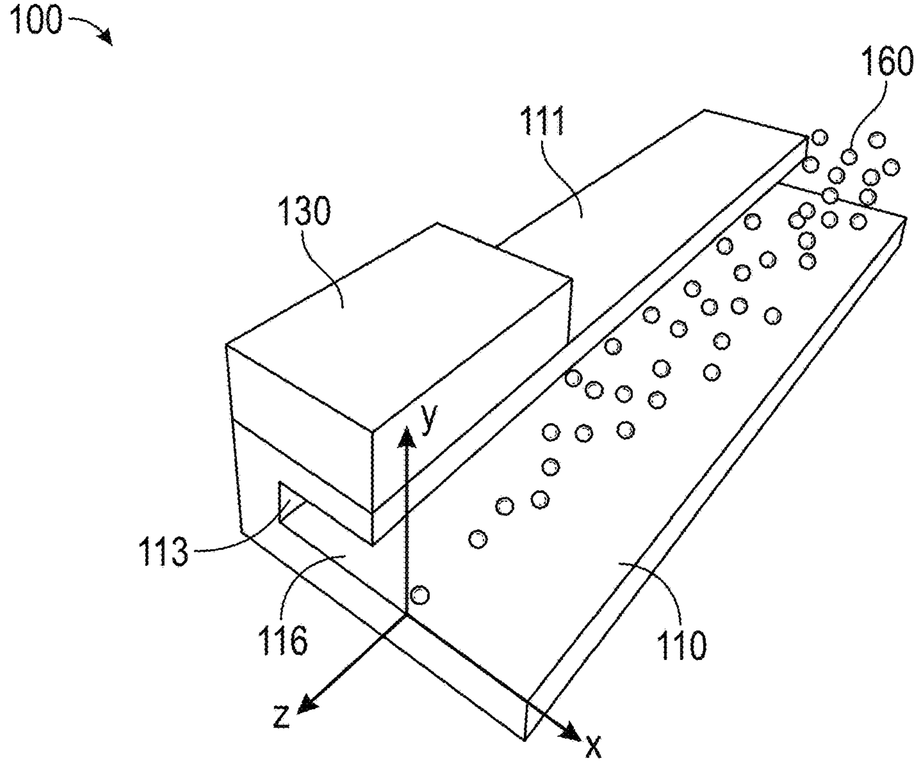

Referring to FIGS. 1-3, a system 100 for high fidelity aerosol jet printing via acoustic forces is shown. The system 100 generally includes an aerosol creation system 152 (e.g., a particles source) configured to store and selectively provide particles 164 which can be aerosolized, an aerosol transport system 154 (e.g., a fluid media source) configured to store and selectively provide a fluid media 162, a compressor 154 configured to selectively aerosolize the particles 164 using the fluid media 162 (e.g., a gas such as compressed air, nitrogen, helium, argon, radon, and/or other desired gas), a nozzle 120 configured to deposit aerosolized particles 160 on a substrate (e.g., a planar substrate and/or a non-planar substrate), an actuator 130 configured for acoustophoresis, and an acoustic generator 150 configured to energize the actuator 130 at a frequency (for example, in the range of about 1 KHz to about 900 MHz, however higher and lower frequencies are contemplated). As used herein, the term acoustophoresis is the migration of particles using sound waves. In aspects, a functional or reactive gas that could promote in-situ processing, like maybe a forming gas or oxidizing or reducing gas may be used.

Figure 4:
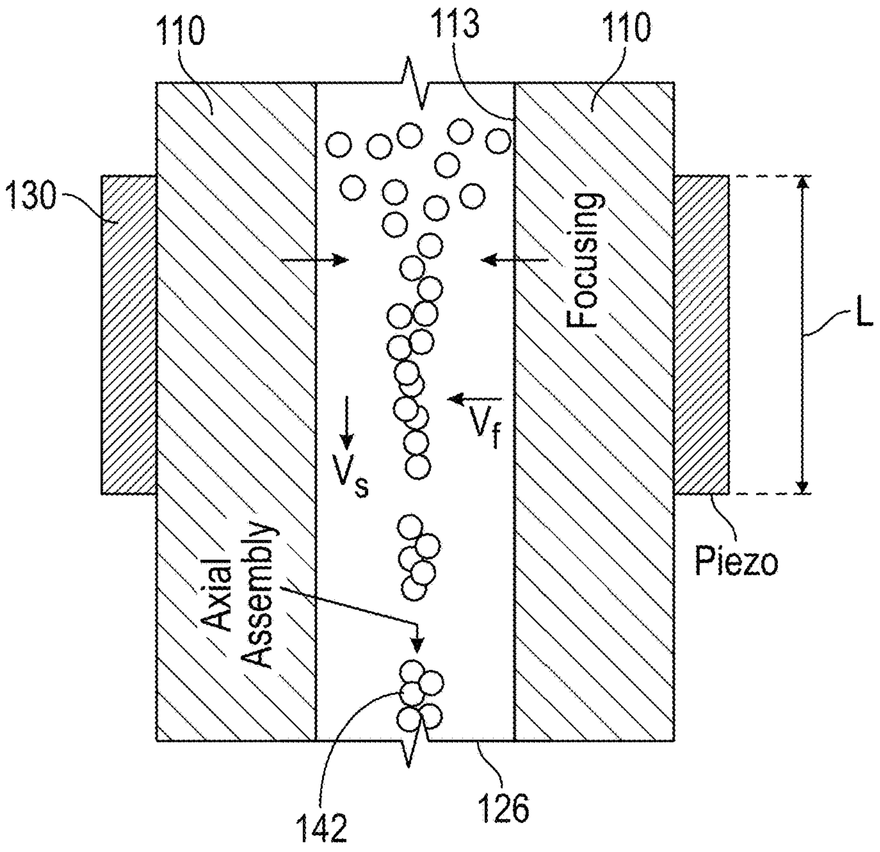
FIG. 4 illustrates a side cutaway view of a column of the system of FIG. 1, in accordance with the present disclosure.
Figure 6:
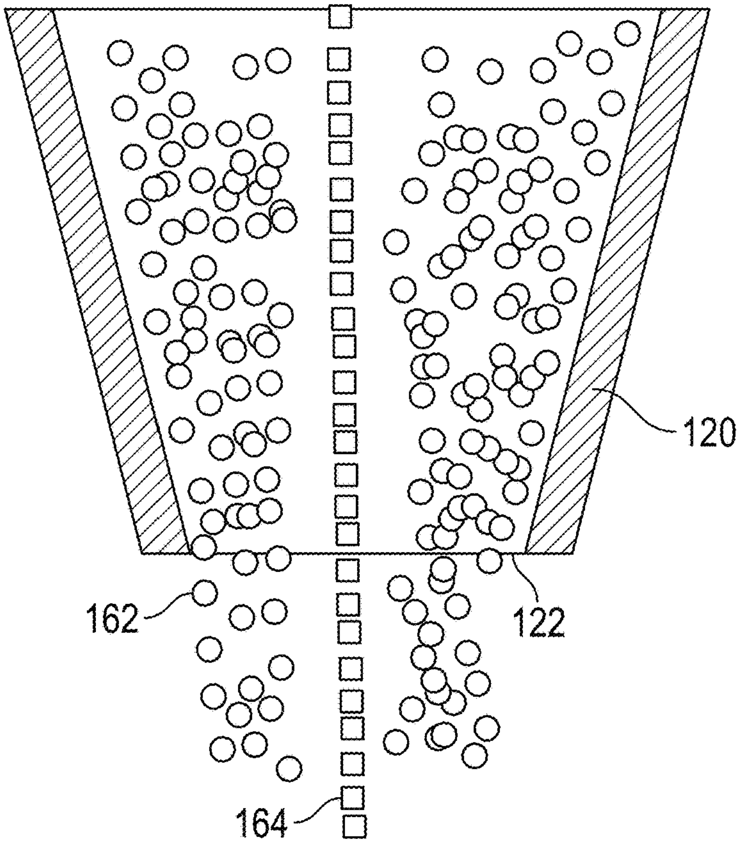
FIG. 6 illustrates a side cutaway view of the nozzle of FIG. 2, in accordance with the present disclosure.

The nozzle 120 generally includes a proximal inlet 112 configured for passage of aerosolized particles 160, a column 110 configured to focus particles 164 which have been aerosolized, when vibrated by the actuator 130, and a distal opening 122 configured for deposition of the particles 164 on a substrate. The distal opening 122 may include any shape such as a square, a rounded square, a rectangular (e.g., a rectangle with square or rounded corners), an oval, and/or a circular shaped cross-section. In aspects, the nozzle may be made from the actuator material. The column 110 is in registration with the proximal inlet 112 and the distal opening 122. The column 110 includes an outer surface 111 configured for mounting of the actuator 130, and an inner surface defining a channel 113 configured for the passage of the aerosolized particles 160 (FIG. 4). The column 110 may taper to the distal opening 122 (FIG. 6). The column 110 may be made from glass, metal (e.g., steel, aluminum, etc.), ceramic, a polymer, or other suitably rigid material that transfers the acoustic energy of the actuator 130 to the channel 113. In aspects, the nozzle may be made from the actuator material itself. In aspects, the channel 113 may act as a resonator (e.g., but not limited to, a half-wave, quarter-wave, and/or an eighth wave resonator) when excited by a resonant frequency of the channel 113. The channel 113 may include any shaped cross section such as a square, rectangular, an oval, and/or a circular cross section. In aspects, the channel may (or may not) be coated with a surface coating to prevent inks from adhering to the sides.

Figure 8:
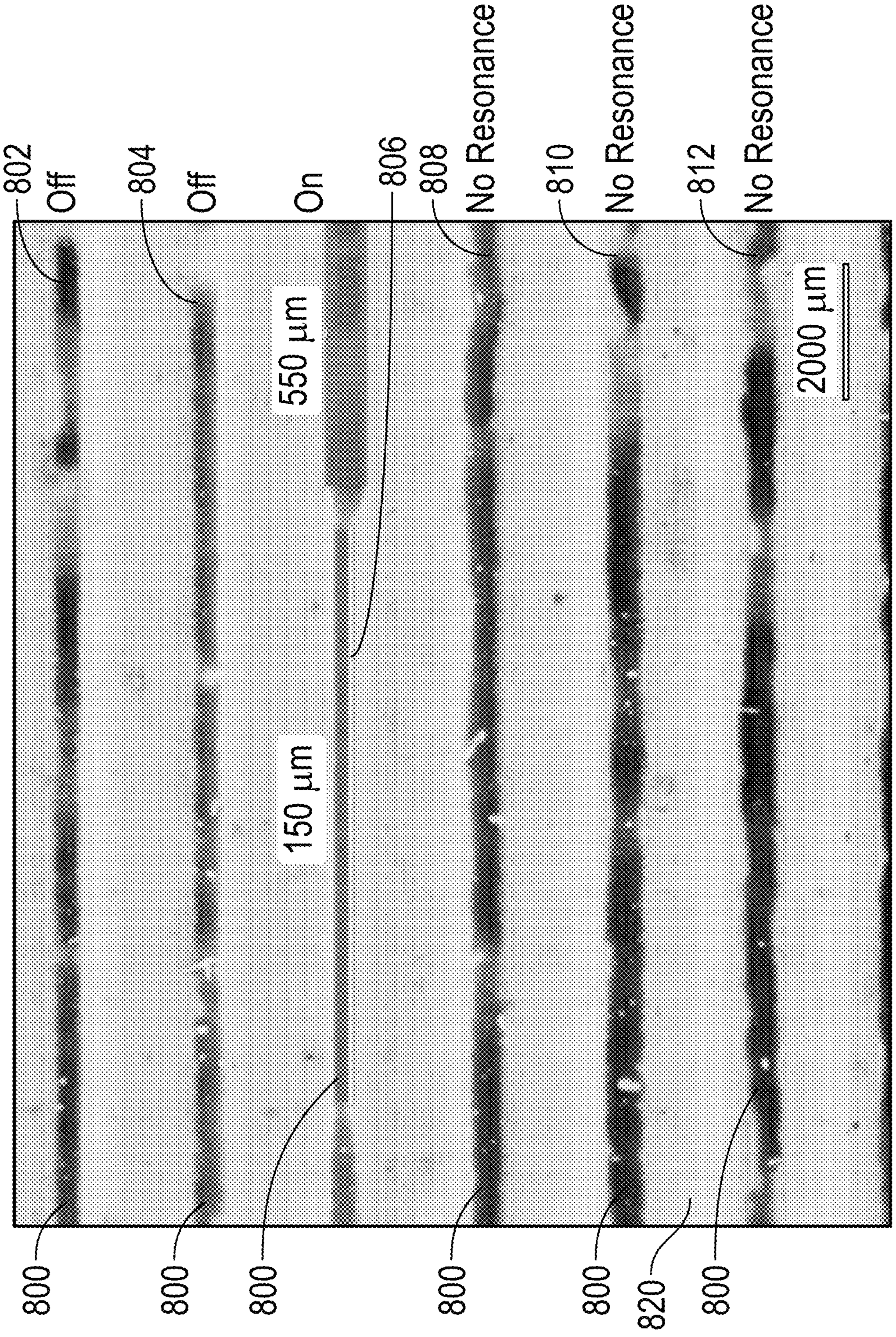
FIG. 8 illustrates various line widths for a non-actuated signals, actuated signals at the resonant frequency, and/or at a non-resonant frequency of a column of the system of FIG. 1, in accordance with the present disclosure.

The nozzle 120 is configured for deposition of materials to 3D print structures. The nozzle 120 is configured for deposition of a print line 800 on a substrate 820 (FIG. 8). The print line 800 may include particles 164 suspended in a solvent, an epoxy, or any other appropriate medium. The distal opening 122 of the nozzle 120 may have any suitable width and/or diameter, for example, a width of about 100 to about 300 um.

The actuator 130 is disposed on the outer surface 111 of the column 110. For example, the actuator 130 may be attached to the outer surface 111 of the column 110 using cyanoacrylate, ultrasonic gel and a clamp, or other suitable means for transmitting the acoustic energy from the actuator 130 to the column 110. The actuator 130 is configured to generate acoustic energy, for example an ultrasonic acoustic standing wave 500 (FIG. 5) in the channel 113 at a focus area 124. In aspects, the actuator 130 may include a piezo transducer. The actuator 130 may be cooled using convection (e.g., air cooled) and/or conduction (e.g., water cooled).

For example, the system 100 may aerosolize the particles 164 (e.g., a polymer) with a fluid media 162 (e.g., nitrogen) and/or ultrasonic waves. Next, the system 100 receives the aerosolized particles 160 in a proximal inlet 112 of a nozzle 120. Next, the system 100 vibrates the column 110 of the nozzle 120 by the actuator 130 at a resonant frequency of a channel of the column, for example about 800 KHz. The aerosolized particles 160 are vibrated in the channel 113. The system 100 then focuses and columnizes the aerosolized particles 160 in the column 110 based on the frequency of the acoustic energy (e.g., about 800 KHz), and deposits the particles 164 on a substrate via a distal opening 122 of the column 110. The disclosed system solves the problems of over spraying, by printing a tightly focused line. Accordingly, the disclosed technology saves on material (e.g., ink) by enabling the smallest printed line without over spray (FIG. 7).

Figure 5:
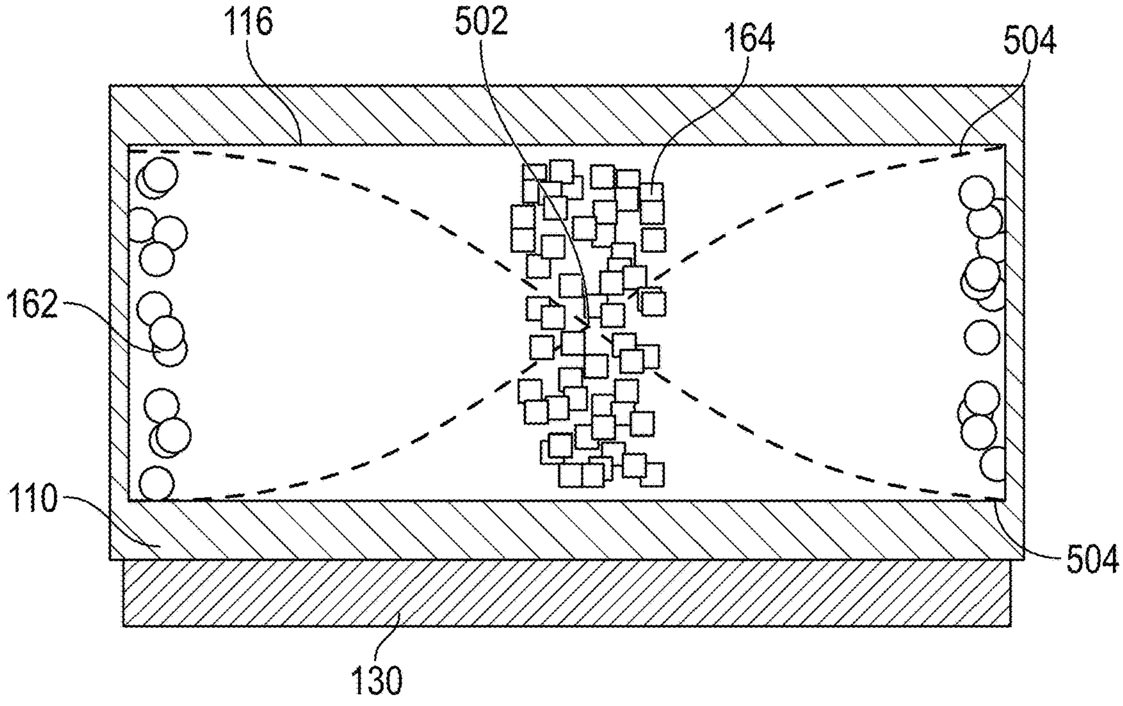
FIG. 5 illustrates a top cutaway view of a standing wave in the column of the system of FIG. 1, in accordance with the present disclosure.

Referring to FIG. 5, a top cutaway view of a standing wave in the column 110 of the system of FIG. 1 is shown. On exposure to an acoustic wave field, radiation force affects the particles 164. The particles 164 are affected by radiation force toward nodes 502 or antinodes 504, and the movement of the particles 164 depends upon physical properties like size, density, or compressibility of the particles 164. Secondary scattering forces may cause the particles 164 to lock together axially and form sub-bands in a direction of the ultrasonic standing wave. Sub-banding may occur at a pressure node.

Referring to FIG. 6, a side cutaway view of the nozzle 120 of FIG. 1 is shown. After the particles 164 are focused and columnized in the channel 113 by the acoustic energy from the actuator 130 (FIG. 5), the particles 164 and the fluid media 162 proceed from the column 110 (FIG. 4) and exit the distal opening 122 of the nozzle 120 and the particles 164 are deposited on a substrate 820 (FIG. 8).

Figure 7:
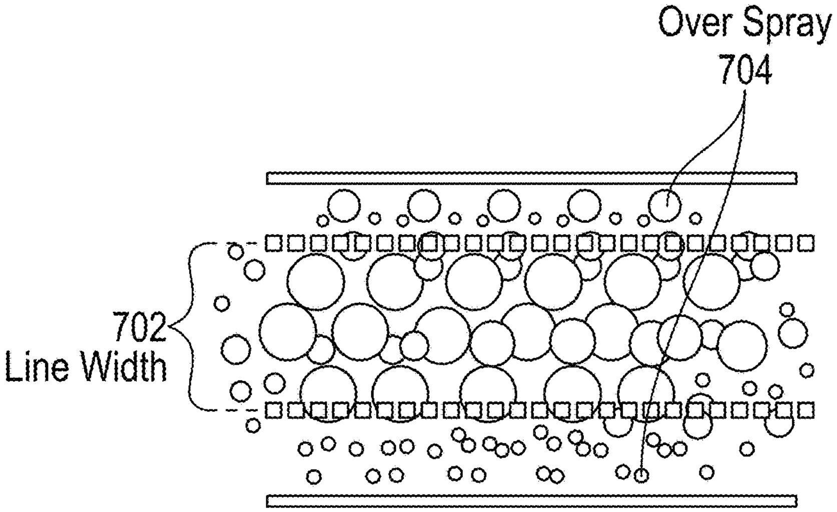
FIG. 7 illustrates line width vs overspray for aerosolized particle deposition.

With reference to FIG. 7, a print line 702 of particles 164 with overspray 704 caused by not resonating the focus area 124 (FIG. 2) is shown. The disclosed technology solved the problem of overspray 704 by better focusing the particle 164 deposition on the substrate 820 (FIG. 8). The disclosed technology further solved the problem of aerodynamic focusing limitations of an acoustic jet system itself in order to achieve smaller ink stream widths than can be obtained by currently available acoustic jet technology.

In FIG. 8, various print line widths are shown. For non-actuated signals, the print lines 802, 804 are about 550 um wide and unfocused. For a print line where the actuator is excited at the resonant frequency of the channel 113 (FIG. 4), the print line 806 is considerably more focused and is about 150 um wide. It is contemplated that ink stream widths of at or below about 5 um wide are achievable with the disclosed technology. In aspects, the print line 806 may be further focused to achieve a print line width around 5 um wide. In aspects, the minimum achievable print line width will be determined by the size of the aerosolized particles in the ink stream. Additionally, when the signal used to excite the actuator 130 (FIG. 4) is turned from an off state to an on state, it typically takes less than one line width to taper from the unfocused width to the focused width. When the frequency of the signal used to actuate the channel 113 is at a frequency other than the resonant frequency (or a ¼ wave multiple thereof), it can lead to an unfocused print line 808, 809, 810.

Figure 9:
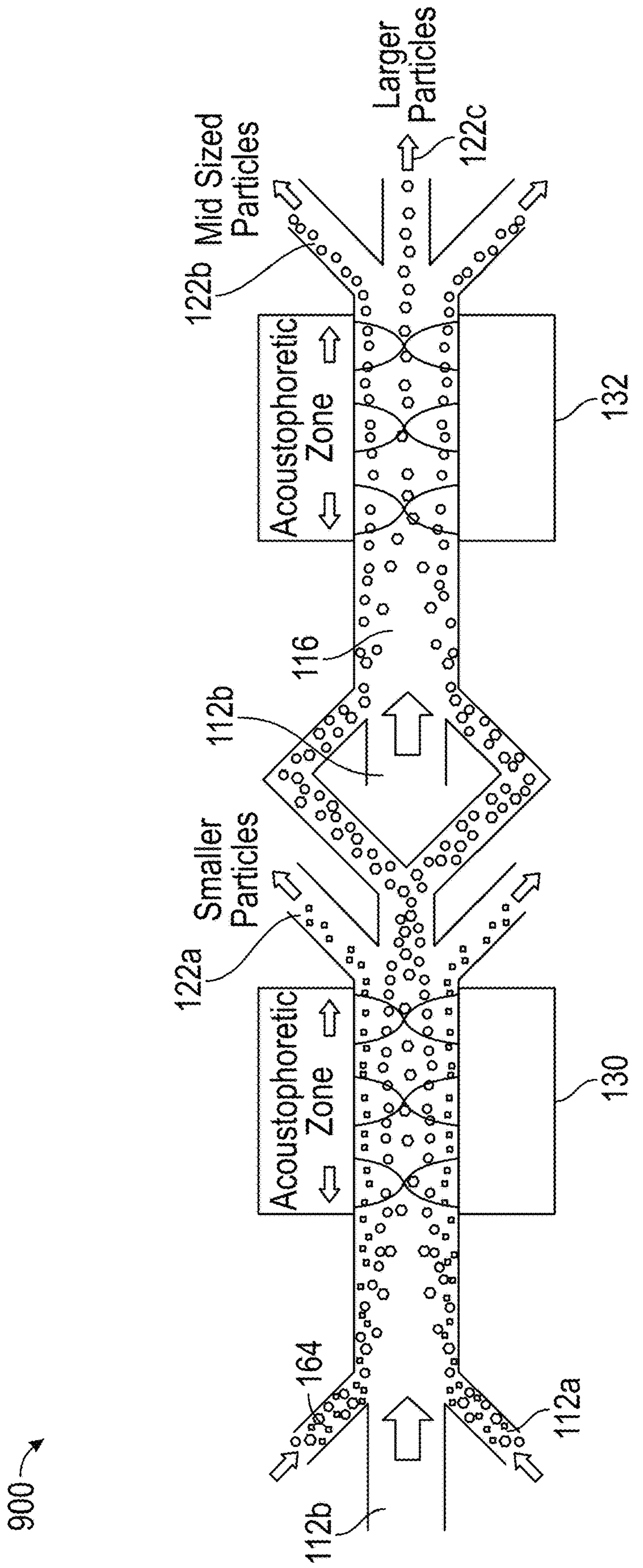
FIG. 9 illustrates a cutaway view of the system of FIG. 1 in a mixed particle size application, in accordance with the present disclosure.
Figure 10A:
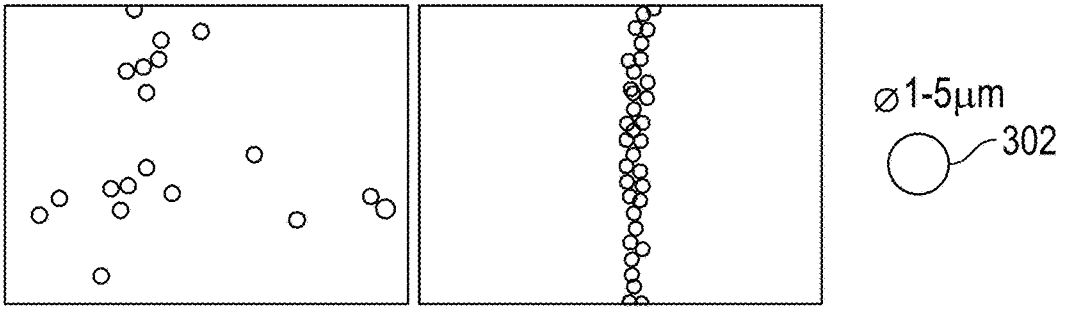
FIGS. 10A-D illustrate example particle shapes for use with the system of FIG. 1, in accordance with the present disclosure.
Figure 10B:
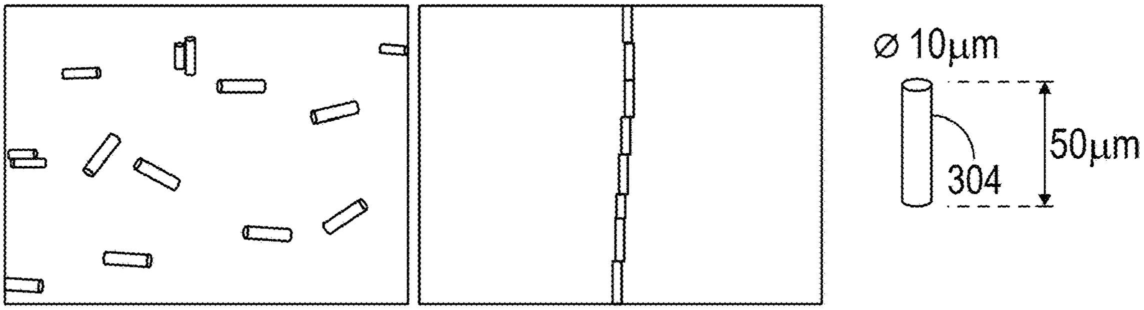
Figure 10C:
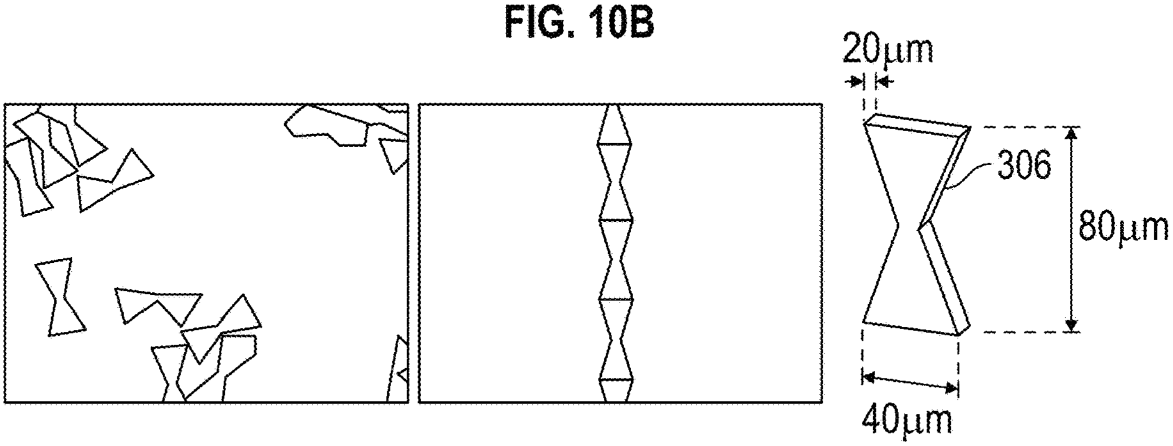
Figure 10D:
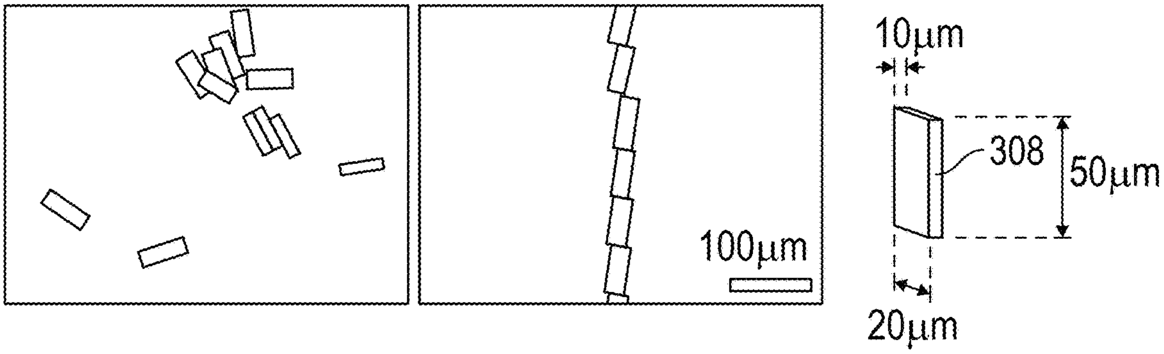

FIG. 9 illustrates a cutaway view of the system of FIG. 1 in a mixed particle size application. The disclosed technology allows for multi material mixing. In a mixed particle size application, the system 100 may further include a second actuator 132 disposed on the column 110 (FIG. 1) configured to further focus the particles 142. In aspects, the system 100 may further include a first proximal inlet 112*a* configured for passage of particles 164 (e.g., particles of different sizes), a second proximal inlet 112*b* configured for passage of the fluid media 162, a first distal opening 122*a* configured for deposition of a first size of particles 164 (e.g., small particles) on a substrate, a second distal opening 122*b* configured for deposition of a first size of particles 164 (e.g., mid-size particles) on a substrate, and a third distal opening 122*a* configured for deposition of a third size of particles 164 (e.g., large size particles) on a substrate. For example, the first size particle may be a conductive particle (e.g., for making a conductive trace), and a second size particle may be a non-conductive particle (e.g., polyimide).

Referring to FIGS. 10A-10D, the particles 164 may be any suitable shape, for example, spheres 302 (e.g., ink spheres), rods 304 (e.g., fibers of ink material), micro-bowties 306, and/or micro-bricks 308 (FIGS. 10A-D). The particles may include microparticles. The particles may be made of polymers, metals (e.g., silver), carbon nanotubes, magnetic inks, polyimide, glass, barium titanate ($BaTiO_3$), a high contrast epoxy-based photoresist material such as SU-8, or other suitable material that can be aerosolized. In aspects, the particles may be biological particles. A benefit of the disclosed technology is that it can work with any material that can be aerosolized and/or introduced into the ink flow stream.

Certain embodiments of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the FIGURES.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing FIGURES are presented only to demonstrate certain examples of the disclosure. Other elements, steps, methods, and techniques that are insubstantially different from those described above and/or in the appended claims are also intended to be within the scope of the disclosure.

What is claimed is:

1. A system for aerosol jet printing, the system comprising:

an aerosolized particle source including aerosolized particles;

a nozzle configured to deposit the aerosolized particles on a substrate, the nozzle including:

a proximal inlet configured to receive the aerosolized particles, wherein the proximal inlet is configured for passage of the aerosolized particles;

a column configured to focus the aerosolized particles when vibrated by an actuator, wherein an inner surface of the column defines a channel, the channel is configured for the passage of the aerosolized particles, and wherein the channel includes a tapered portion; and a distal opening configured for deposition of the aerosolized particles on a substrate;

an actuator configured to generate acoustic energy for migrating the aerosolized particles; and a generator configured to selectively energize the actuator, wherein the actuator vibrates the channel at a resonant frequency of the channel.

2. The system of claim 1, wherein the distal opening includes a square, a rounded square, a rectangular, a rounded rectangle an oval, or a circular shaped cross-section.

3. The system of claim 1, wherein the column is in registration with the proximal inlet and the distal opening.

4. The system of claim 1, wherein the column includes an outer surface configured for mounting of the actuator.

5. The system of claim 1, wherein the column tapers to the distal opening.

6. The system of claim 1, wherein the column is made from a material that transfers acoustic energy.

7. The system of claim 1, wherein the column is configured to transfer the acoustic energy of the actuator to the channel.

8. The system of claim 1, wherein the channel is at least one of a half-wave, a quarter-wave, or an eighth-wave resonator.

9. The system of claim 1, wherein the channel includes a square, a rectangular, an oval, or a circular shaped cross-section.

10. A nozzle for aerosol jet printing, comprising:

a proximal inlet configured for passage of aerosolized particles;

a column configured to focus the aerosolized particles when vibrated by an actuator, wherein an inner surface of the column defines a channel, the channel is configured for the passage of the aerosolized particles, and wherein the channel includes a tapered portion; and a distal opening configured for deposition of the aerosolized particles on a substrate, wherein the channel is configured to be vibrated by the actuator at a resonant frequency of the channel.

11. The nozzle of claim 10, wherein the distal opening includes a rectangular, an oval, or a circular shaped cross-section.

12. The nozzle of claim 10, wherein the column is in registration with the proximal inlet and the distal opening.

13. The nozzle of claim 10, wherein the column includes an outer surface configured for mounting of the actuator.

14. The nozzle of claim 10, wherein the column tapers to the distal opening.

15. The nozzle of claim 10, wherein the column is made from a material that transfers acoustic energy.

16. The nozzle of claim 10, wherein an inner surface of the column defines a channel, the channel is configured for the passage of the aerosolized particles.

17. The nozzle of claim 16, wherein the column is configured to transfer the acoustic energy of the actuator to the channel.

18. A method for aerosol jet printing, the method comprising:

aerosolizing particles with a fluid media;

receiving the aerosolized particles in a proximal inlet of a nozzle, the proximal inlet configured for passage of the aerosolized particles; and vibrating a column of the nozzle by an actuator at a resonant frequency of a channel of the column, wherein the column is configured to focus the aerosolized particles when vibrated at the resonant frequency of the channel by the actuator to focus a print line, wherein the column includes a tapered portion, wherein the aerosolized particles are vibrated in the channel.

19. The method of claim 18, further comprising focusing the aerosolized particles in the column based on the frequency of the acoustic energy.

20. The method of claim 19, further comprising depositing the particles on a substrate via a distal opening of the column.

21. The method of claim 19, wherein the actuator includes a piezo transducer.

* * * * *